United States Patent
Budinger

(10) Patent No.: US 7,845,549 B2
(45) Date of Patent: Dec. 7, 2010

(54) MIM BRAZE PREFORMS

(75) Inventor: David Edwin Budinger, Loveland, OH (US)

(73) Assignee: General Electric Company, Schenectady, NY (US)

( * ) Notice: Subject to any disclaimer, the term of this patent is extended or adjusted under 35 U.S.C. 154(b) by 264 days.

(21) Appl. No.: 11/421,353

(22) Filed: May 31, 2006

(65) Prior Publication Data

US 2007/0284410 A1    Dec. 13, 2007

(51) Int. Cl.
*B23K 31/02* (2006.01)

(52) U.S. Cl. .................. 228/246; 228/245; 228/256; 29/889.1

(58) Field of Classification Search ...... 228/245–248.1, 228/256; 29/889.1
See application file for complete search history.

(56) References Cited

U.S. PATENT DOCUMENTS

| | | | |
|---|---|---|---|
| 3,350,179 A * | 10/1967 | Stenerson | 75/233 |
| 4,554,218 A * | 11/1985 | Gardner et al. | 428/567 |
| 4,971,755 A | 11/1990 | Kawano et al. | |
| 4,981,512 A | 1/1991 | Kapoor | |
| 5,077,002 A | 12/1991 | Fried | |
| 5,236,116 A * | 8/1993 | Solanki et al. | 228/178 |
| 5,296,308 A | 3/1994 | Caccavale et al. | |
| 5,511,721 A | 4/1996 | Demo et al. | |
| 5,523,170 A | 6/1996 | Budinger et al. | |
| 5,666,643 A | 9/1997 | Chesnes et al. | |
| 5,758,416 A | 6/1998 | Reverman et al. | |
| 5,902,421 A | 5/1999 | Christy | |
| 6,054,693 A | 4/2000 | Barmatz et al. | |
| 6,416,278 B1 | 7/2002 | Caddell, Jr. et al. | |
| 6,434,946 B1 | 8/2002 | Shaw et al. | |
| 6,435,824 B1 | 8/2002 | Schell et al. | |
| 6,443,700 B1 | 9/2002 | Grylls et al. | |
| 6,451,454 B1 | 9/2002 | Hasz et al. | |
| 6,464,128 B1 | 10/2002 | Messelling et al. | |
| 6,494,677 B1 | 12/2002 | Grady | |
| 6,530,971 B1 | 3/2003 | Cohen et al. | |
| 6,648,596 B1 | 11/2003 | Grylls et al. | |
| 6,679,680 B2 | 1/2004 | Um et al. | |

(Continued)

FOREIGN PATENT DOCUMENTS

EP    0800889 A1    10/1997

(Continued)

OTHER PUBLICATIONS

European Search Report dated Aug. 4, 2009 for EP Application No. 07 108 725.8-1262.

*Primary Examiner*—Jessica L Ward
*Assistant Examiner*—Devang R Patel
(74) *Attorney, Agent, or Firm*—Adams Intellectual Property Law; Janice Whitlow, Esq.

(57) ABSTRACT

A method of making a braze preform includes: providing a mixture of a brazing alloy in metallic powder form and a binder; melting the binder and forming the mixture into a preform having a preselected shape; removing a majority of the binder from the preform; and heating the preform to remove the remainder of the binder and to sinter the metallic powder together. The preform may include a wear-resistant material therein. Such preforms may be used to form a braze joint between two metallic components, or to produce a metallic component with a wearcoated surface.

8 Claims, 5 Drawing Sheets

U.S. PATENT DOCUMENTS

| | | |
|---|---|---|
| 6,785,961 B1 | 9/2004 | Caddell, Jr. et al. |
| 6,793,457 B2 | 9/2004 | Caddell et al. |
| 6,827,254 B2 * | 12/2004 | Hasz et al. ............... 228/246 |
| 6,905,308 B2 | 6/2005 | Hagle et al. |
| 6,982,123 B2 | 1/2006 | Budinger et al. |
| 2002/0119338 A1 | 8/2002 | Hasz et al. |
| 2002/0169066 A1 | 11/2002 | Cassidy et al. |
| 2003/0062396 A1 * | 4/2003 | Kovacich ............... 228/56.3 |
| 2004/0173304 A1 | 9/2004 | Bruce et al. |
| 2005/0011196 A1 * | 1/2005 | Leen et al. ............... 60/772 |
| 2006/0289496 A1 | 12/2006 | Kelly |
| 2007/0274854 A1 | 11/2007 | Kelly et al. |
| 2007/0295785 A1 | 12/2007 | Budinger |

FOREIGN PATENT DOCUMENTS

| | | |
|---|---|---|
| FR | 2 785 559 A1 | 1/1991 |
| WO | 0240212 A3 | 5/2002 |

\* cited by examiner

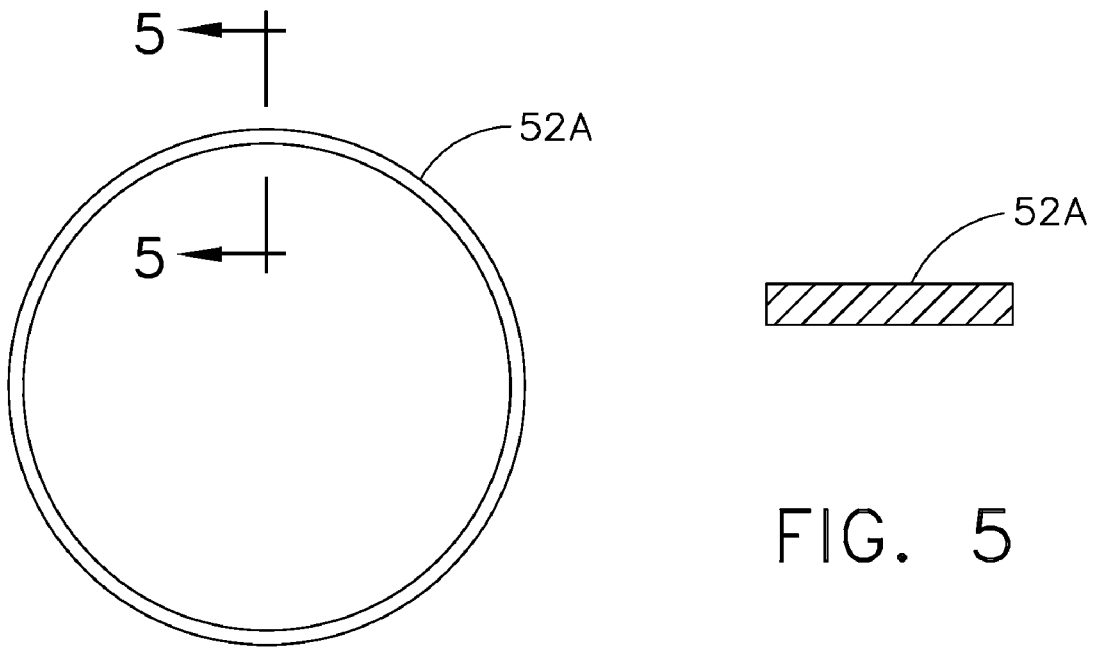
FIG. 4
FIG. 5
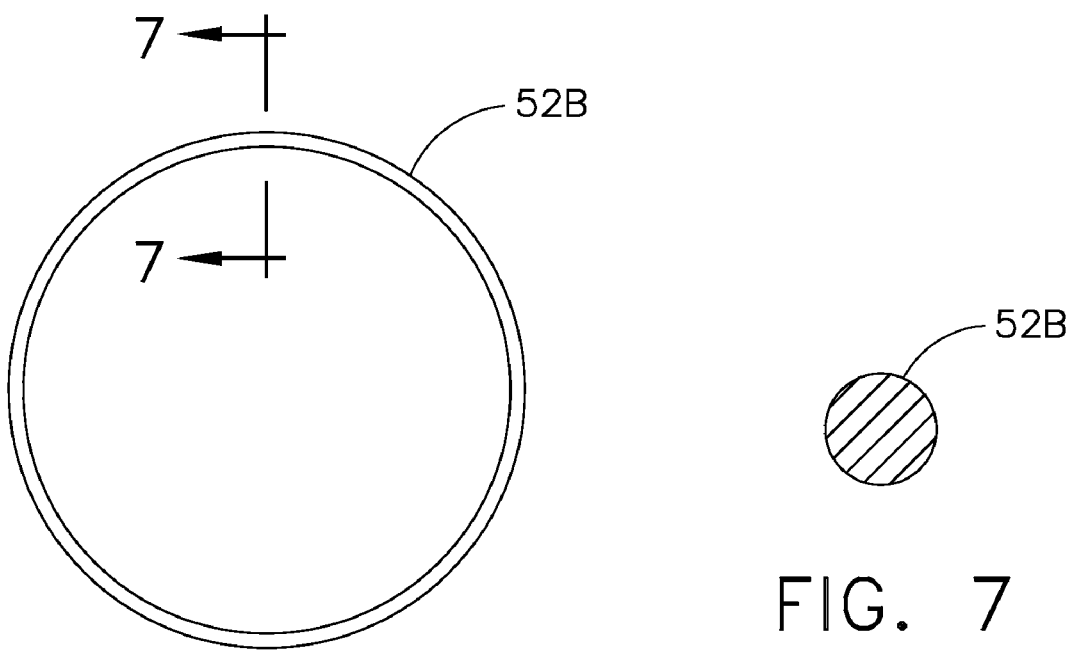
FIG. 6
FIG. 7

MIM BRAZE PREFORMS

BACKGROUND OF THE INVENTION

This invention relates generally to braze joining of metallic components and more particularly to braze alloy preforms.

Metallic components, especially gas turbine engine components, are often bonded to each other through brazing. In brazing, a metallic alloy with a melting point lower than the components being joined is placed between the components. The entire assembly is then heated to a temperature above the melting point of the braze alloy and below the melting point of the components, causing the alloy to flow into the joint. When cooled, the result is a structural joint that is produced without detrimentally effecting the metallurgical properties of the joined components.

Several prior art methods exist for placement of the braze alloy into the joint. But there are shortcomings associated with each prior art method. For example, braze slurry can used, but the material is hand applied and the control of the alloy bead size is operator dependent. Braze rope can be produced from powders and binders but it has a very limited shelf life and is fragile to handle. Braze wire preforms can be produced by drawing wire, forming the shape and then boronizing the wire to introduce melting point depressants. However, only alloys that are drawable or contain boron can be produced by this method. Preforms can be produced by casting a tape of braze material and then sintering the tape. The preform shapes are then cut from the sintered tape. This process limits itself to two-dimensional shapes. Three-dimensional preforms can be produced but this requires additional hand benching or machining.

Accordingly, there is a need for a method of producing durable braze preforms having arbitrary shapes.

BRIEF SUMMARY OF THE INVENTION

The above-mentioned need is met by the present invention, which according to one aspect provides a method of producing a braze preform, including: providing a mixture of a brazing alloy in metallic powder form and a binder; melting the binder and forming the mixture into a preform having a preselected shape; removing a portion of the binder from the preform; and heating the preform to remove the remainder of the binder and to sinter the metallic powder together.

According to another aspect of the invention, a method of bonding together two metallic components includes: providing a mixture of a brazing alloy in metallic powder form and a binder; melting the binder and forming the mixture into a preform having a preselected shape; removing a portion of the binder from the preform; heating the preform to remove the remainder of the binder and to sinter the metallic powder together; placing the preform adjacent to or within a joint defined between the metallic components; heating the metallic components and the preform to a temperature below the melting point of either of the metallic components and above the melting point of the preform to cause the braze alloy to melt and flow into the joint; allowing the braze alloy to cool to form a bond between the metallic components.

According to another aspect of the invention, a method of producing a metallic component with a wearcoated surface includes: providing a mixture of a wear-resistant material in metallic powder form and a binder; melting the binder and forming the mixture into a preform having a preselected shape; removing a portion of the binder from the preform; heating the preform to remove the remainder of the binder and to sinter the metallic powder together; placing the preform adjacent the surface; placing a braze alloy in contact with the wear-resistant material and the surface; heating the metallic components, the braze alloy, and the preform to a temperature below the melting point of either of the metallic component and the wear-resistant material, and above the melting point of the preform to cause the braze alloy to melt and flow into the joint; and allowing the braze alloy to cool to form a bond between the metallic component and the wear-resistant material.

BRIEF DESCRIPTION OF THE DRAWINGS

The invention may be best understood by reference to the following description taken in conjunction with the accompanying drawing figures in which:

FIG. 4 is a schematic end view of a braze preform;

FIG. 5 is an enlarged cross-sectional view taken along lines 5-5 of FIG. 4;

FIG. 6 is a schematic end view of an alternative braze preform;

FIG. 7 is an enlarged cross-sectional view taken along lines 7-7 of FIG. 6;

DETAILED DESCRIPTION OF THE INVENTION

Figure 1:
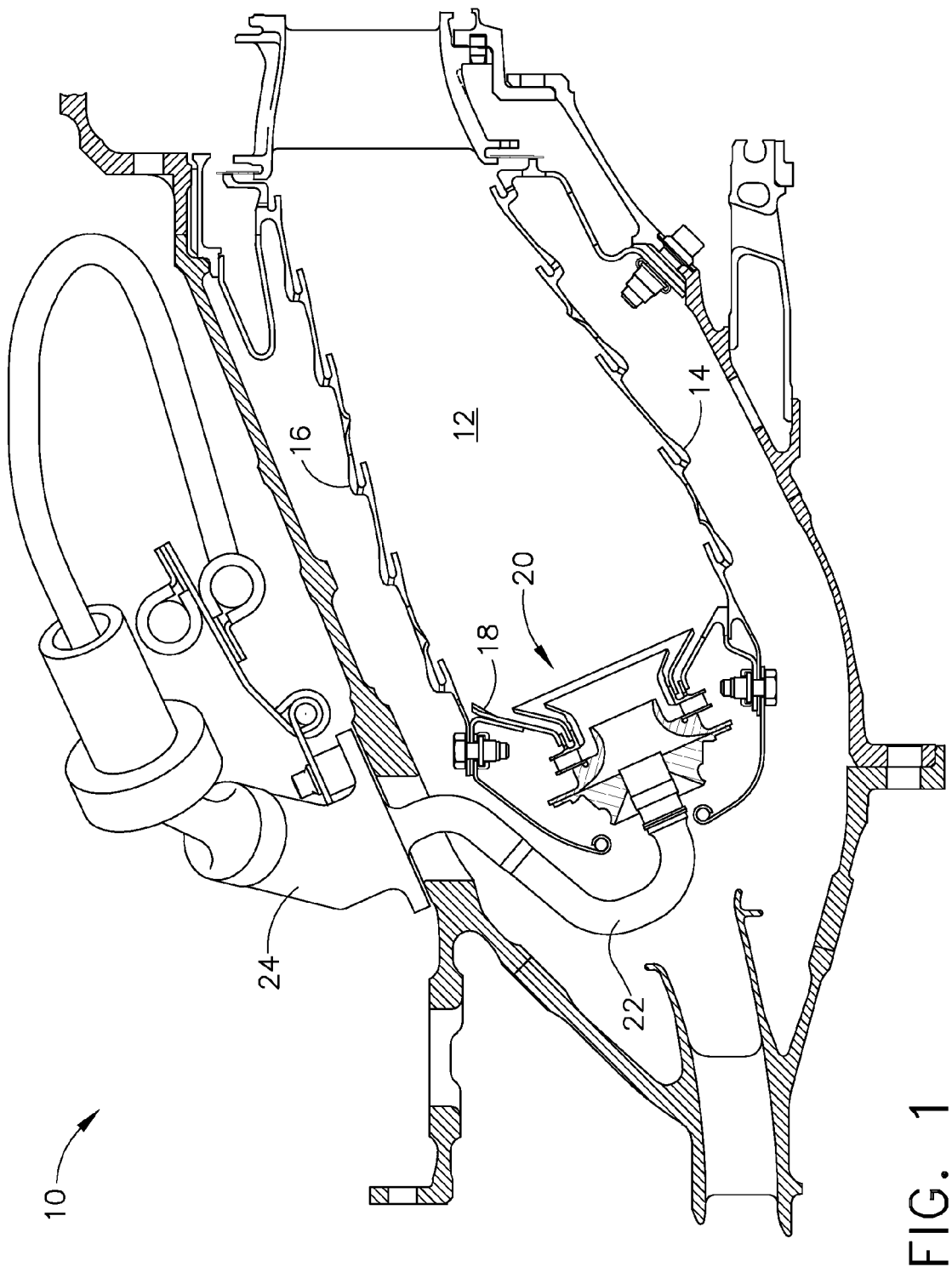
FIG. 1 is a cross-sectional view of a combustor for a gas turbine engine.

Referring to the drawings wherein identical reference numerals denote the same elements throughout the various views, FIG. 1 shows a combustor 10 of the type suitable for use in a gas turbine engine. The present invention is equally applicable to the brazing of other types of metallic components, non-limiting examples of which include rotating turbine blades, stationary turbine vanes, turbine shrouds, and the like.

The combustor 10 includes a chamber 12 defined between annular inner and outer liners 14 and 16. Disposed between and interconnecting the outer and inner liners 14 and 16 near their upstream ends is an annular dome plate 18. A plurality of circumferentially spaced swirler assemblies 20 are disposed in the dome plate 18. A fuel tube 22 extends from a manifold 24 to each of the swirler assemblies 20.

Figure 2:
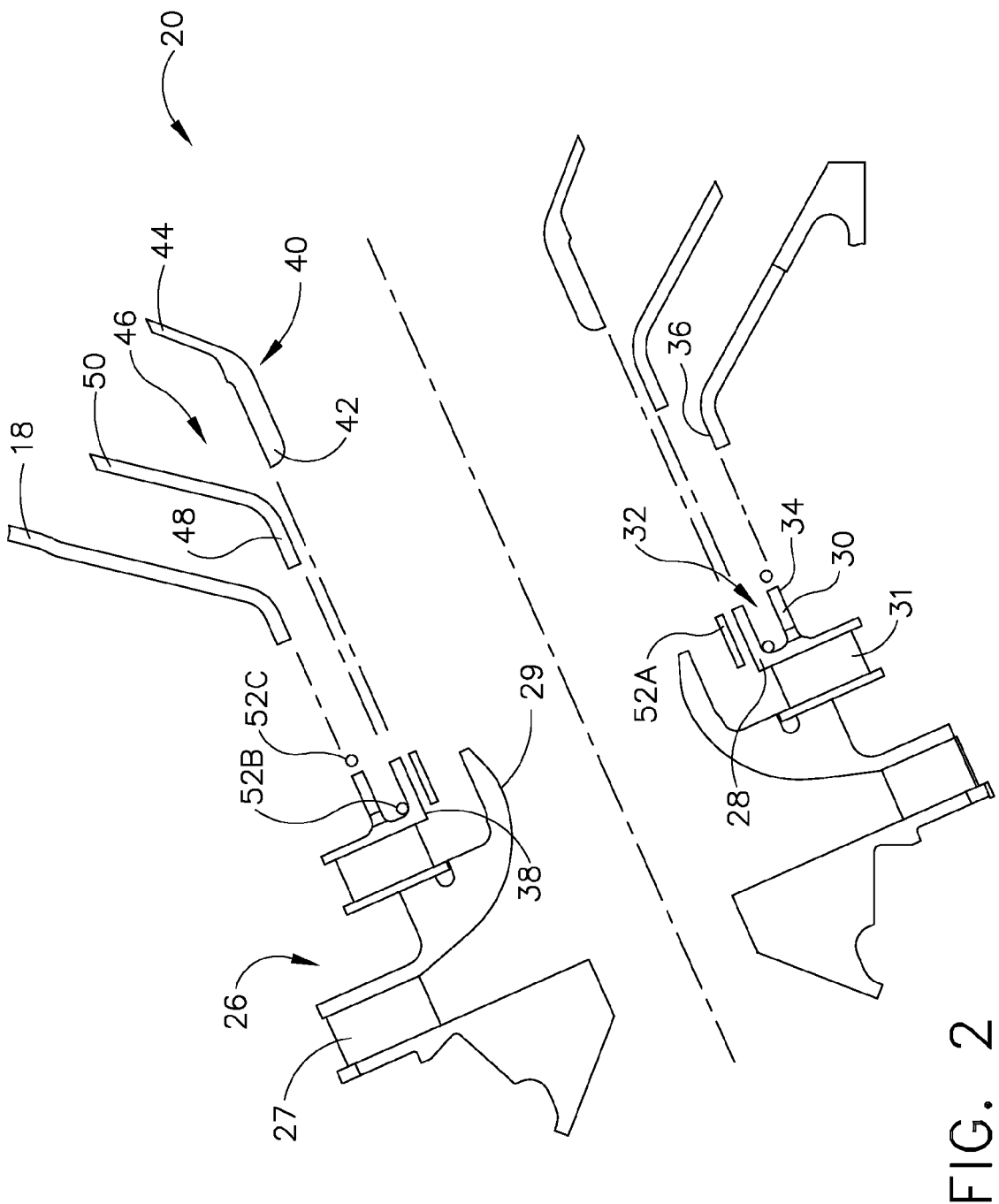
FIG. 2 is an exploded side view of a portion of the combustor shown in FIG. 1.

FIG. 2 illustrates one of the swirler assemblies 20 in more detail, with its components disassembled. Components of the swirler are shown disassembled in FIG. 2. The forward end of each swirler assembly 20 encompasses a swirl cup 26 which includes a primary swirler 27, a venturi 29, and a secondary swirler 31. The swirl cup 26 may be made of a single casting, or from separate elements joined together by brazing.

The downstream end of swirl cup 26 includes inner and outer axially extending annular flanges 28 and 30, disposed concentrically about the longitudinal axis of the swirl cup 26, with the outer annular flange 30 spaced from the inner flange 28 so as to define an annular groove 32 therebetween. The outer annular flange 30 defines an outer cylindrical surface 34 that is received within an opening or eyelet 36 formed in the dome plate 18. The inner annular flange 28 defines an inner cylindrical surface 38.

The swirler assembly 20 includes an outlet sleeve or flare cone 40 attached to the downstream end of swirl cup 26. The outlet sleeve 40 has a substantially cylindrical body portion 42 at its upstream end and a flared or diverging portion 44 at its downstream end. The body portion 42 is sized so that its upstream end will fit inside the inner cylindrical surface 38 of the swirl cup 26.

A deflector 46 is also attached to the downstream end of swirl cup 26. The deflector 46 has a substantially cylindrical body portion 48 at its upstream end and a flared or diverging portion 50 at its downstream end. The body portion 48 is sized so that its upstream end will fit within the annular groove 32 of the swirl cup 26.

The parts of the swirler assembly 20 are assembled by brazing. In contrast to prior art practice, the brazing alloy is provided as a preform made by metal injection molding (MIM) and positioned adjacent or within joints defined by component parts to be joined. In the illustrated example, a first preform 52A (shown in detail in FIGS. 4 and 5) is an annular band with a generally rectangular cross-sectional shape which is disposed between the flare cone 40 and the inner cylindrical surface 38 of the swirl cup 26. A second preform 52B (shown in detail in FIGS. 6 and 7) is a ring of circular cross-section wire placed into the annular groove 32. A third preform 52C is another ring of circular cross-section wire placed at the juncture of the deflector and the dome plate 18. Many configurations of braze joints are known, and the size and shape of the preforms 52 may be varied as needed to provide the desired pre-braze fit and quantity of braze alloy for a particular application.

Once the swirler assembly 20 has been pre-assembled and fixtured as necessary, it is subjected to a known brazing cycle which melts the preforms 52A, 52B, 52C, forming metallurgical bonds between the swirler assembly components.

The braze preforms 52A, 52B and 52C are manufactured as follows. Initially, a braze alloy in the form of a metallic powder and a suitable binder are provided.

Suitable braze alloys are known in the art and typically include an alloy base similar to the component being brazed and a melting point depressant. For gas turbine engine components, the braze alloy is typically nickel-based or cobalt-based. The braze alloy composition typically contains one or more components for lowering the melting point of the braze alloy for ease of fabrication and to ensure that the braze alloy melts in a temperature range lower than that of any components being joined. Melting point suppressants for nickel-base and cobalt-base braze alloys include silicon, boron, phosphorous, or combinations thereof.

The specific braze alloy used is not of particular importance so long as it is capable of being processed into a powder for the MIM process.

The binder may be any material which is chemically compatible with the metallic powder and which allows the required processing (e.g. mixing, injection, solidification, and leaching). Examples of known suitable binders include waxes and polymer resins. The binder may be provided in a powder form.

The binder and the metallic powder are thoroughly mixed together. The mixture is then heated to melt the binder and create a fluid with the metallic powder coated by the binder. Next, the mixture is formed into a predetermined shape, such as the rings or bands described above. One way of forming the mixture is to use a known injection-molding apparatus to extrude the mixture into the cavity of a mold. The mold may optionally be heated to avoid excessively rapid solidification of the binder which would result in a brittle preform. Instead of melting the binder in a discrete batch, the mixture could be molded in a continuous manner using known injection molding equipment capable of melting the binder as it passes through the screw. Once the mixture has solidified, the mold is opened and the resulting uncompacted or "green" preform is removed.

The green preform comprises metal particles suspended in the solidified binder. The preform is not suitable for use as a finished component, but merely has sufficient mechanical strength to undergo further processing. The preform is leached to remove a portion of the binder, creating a "brown" preform. The portion of the binder removed may comprise a majority of the binder volume. The removal may be achieved by submerging or washing the preform with a suitable solvent which dissolves the binder but does not attack the metallic powder.

Next, the preform is sintered. The preform is placed in a chamber which includes means for creating a suitable atmosphere to prevent undesired oxidation of the preform or other reactions during the sintering process. A supply of inert gas such as argon may be connected to the interior of the chamber. The sintering could also be performed under a vacuum. A heating source is disposed in communication with the chamber.

The preform is heated to a temperature below the liquidus temperature of the metallic powder and high enough to cause the metallic powder particles to fuse together and consolidate. The high temperature also melts and drives out any remaining binder. The preform is held at the desired temperature for a selected time period long enough to result in a consolidated preform. The heating rate is selected depending on variables such as the mass of the preform and the and the desired cycle time of the sintering process.

When the sintering cycle is complete, the preform is removed from the chamber and allowed to cool. When required, the preform may be subjected to further consolidation using a known hot isostatic pressing ("HIP") process to result in a substantially 100% dense component. If desired, the preform may be subjected to additional processes such as final machining, coating, inspection, etc. in a known manner. This results in a finished preform 52A, 52B, 52C which is ready for use in a brazing process as described above.

The use of the MIN process described above will allow braze preforms 52A, 52B, 52C to be produced which would replace prior art braze ropes or slurry pastes at lower cost than drawn braze wire or sintered braze tape. MIM preforms 52A, 52B, 52C as described above would have similar density to known drawn braze wire or sintered tape (i.e. substantially 100% dense) versus ropes or slurry pastes at about 50% dense. The denser material would allow the braze reservoir size to decrease since the MIN preform 52A, 52B, 52C have increased density to feed the braze joint.

Figure 3:
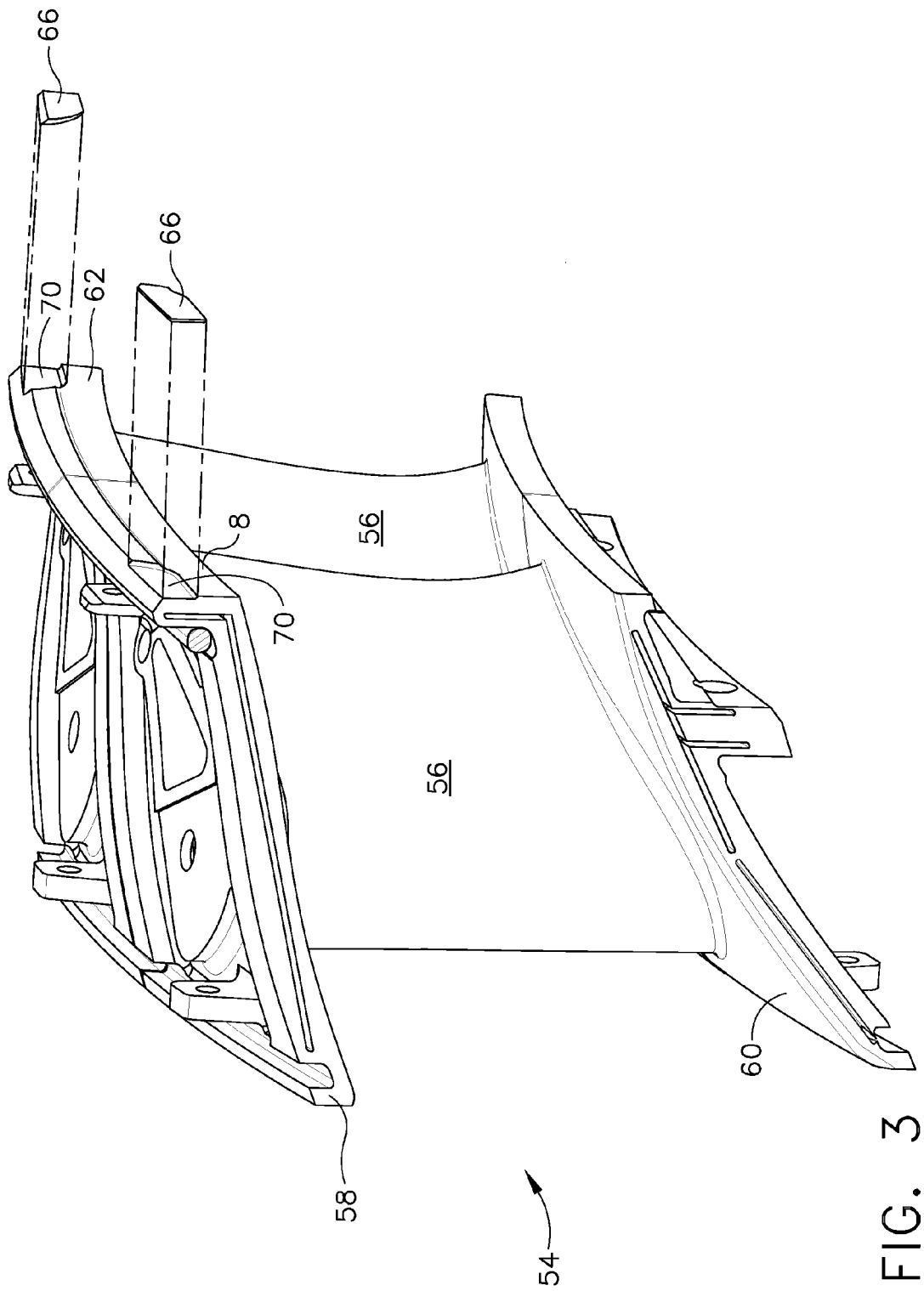
FIG. 3 is a schematic perspective view of a gas turbine engine nozzle.

The MIM process may also be used to create preforms usable as wearcoats. For example, FIG. 3 depicts an exemplary turbine nozzle segment 54 having nozzle vanes 56 disposed between arcuate outer and inner bands 58 and 60. The vanes 56 define airfoils configured so as to direct the combustion gases to a turbine rotor (not shown) located downstream thereof. The outer and inner bands 58 and 60 define the outer and inner radial boundaries, respectively, of the gas flow through the nozzle segment 54. A gas turbine engine will include a plurality of such segments 54 arranged circumferentially in an annular configuration. Portions of the aft surfaces 62 and 64 of the outer and inner bands 58 and 60 are subject to relative motion and wear against other parts of the engine. It is desirable to provide a wear-resistant quality to these surfaces. This may be done by applying a preform containing a wear-resistant material to those surfaces or portions thereof, for example radiused recesses 70 of the outer band 58 as shown in FIG. 3. In the prior art, these preforms are made from sintered tape and are generally limited to two-dimensional shapes. This requires hand blending of the preform to fit into the machined radius of the recess 70 or the use of an offset to keep the preform out of this radius. The present invention provides a method for making preforms that can have complex three dimensional shapes.

Figure 8:
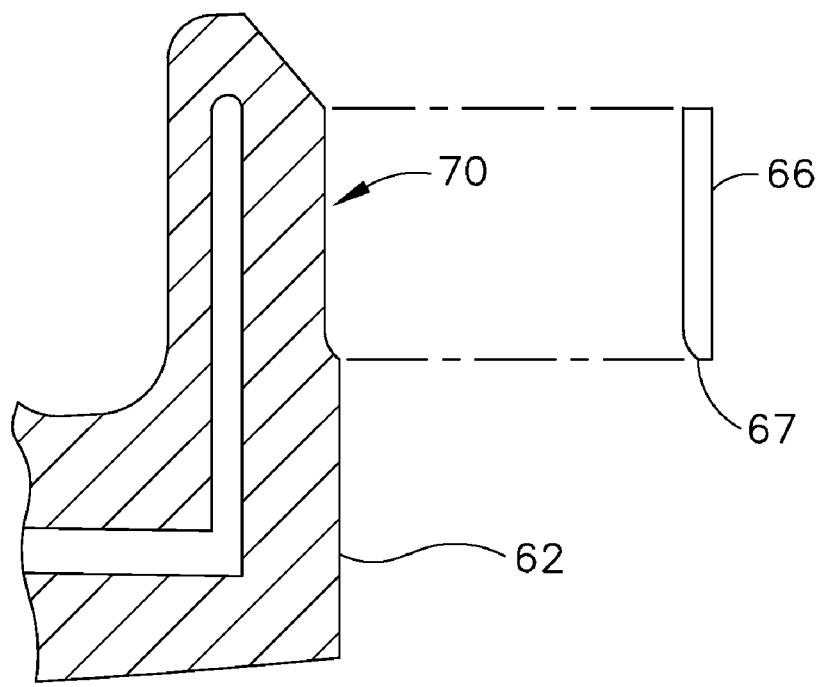
FIG. 8 is a cross-sectional view of a portion of the nozzle of FIG. 3.
Figure 9:
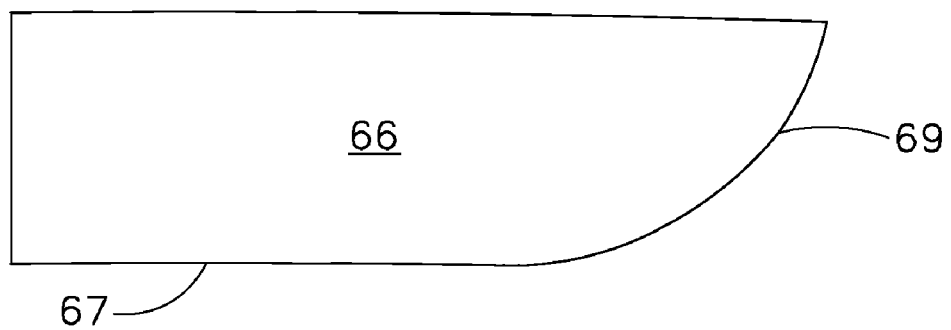
FIG. 9 is an end view of a preform for use with the nozzle of FIG. 3.
Figure 10:
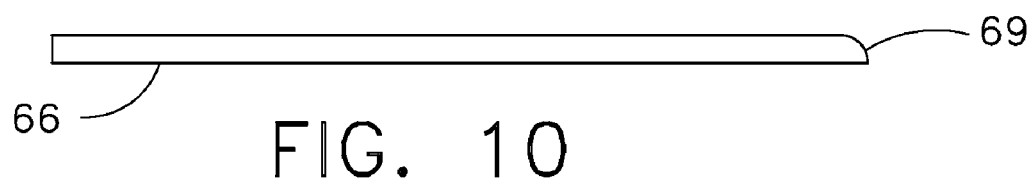
FIG. 10 is a top view of the preform of FIG. 9.

Exemplary preforms 66 are shaped and sized to fit into and conform to the recesses 70 (see FIGS. 8, 9, and 10). In this particular example, the preforms 66 are plate-like members with radiused side and radially inner edges 67 and 69, respectively. The preforms 66 are made using a MIM process substantially similar to the process described above for the braze preforms 52, including the steps of mixing a metallic powder and a binder, injection molding the mixture to create a "green" preform, leaching the binder from the green preform to create a "brown" preform, and finally sintering the brown preform to produce a final preform usable as a wearcoat. This is only one example of a feature that can be embodied in a MIM-produced preform without the need for hand blending.

In addition to the braze alloy as described above, the preforms 66 include a wear-resistant material. The wear-resistant material may comprise a ceramic wear-resistant powder. In one example, the wear-resistant powder comprises a carbide, particularly a chromium carbide. The chromium carbide may be selected from the group consisting of $Cr_{23}C_6$, $Cr_7C_3$, $Cr_3C_2$, and combinations thereof. The chromium carbide is generally in the form of a pre-alloyed carbide powder, wherein the particles of the powder are homogeneous and uniform throughout their cross sections. Alternatively, the chromium carbide, such as $Cr_3C_2$, may be blended with another material, such as NiCr which functions as a metallic binder.

Alternatively, the preforms 66 may include a known alloy wear-resistant material that forms a lubricious oxide film over its surface during actual use, which oxide functions to lubricate the interface between the treated component and adjacent structure at high temperatures (e.g., above 1000° F.) to reduce wear. One particular group of materials that forms a lubricating or lubricious oxide film includes cobalt alloys.

Examples of specific braze alloy compositions and alloy wear-resistant compositions are described in U.S. Pat. No. 6,451,454, issued to Hasz et al. and assigned to the assignee of the present invention.

It is also possible to eliminate the braze alloy from the preforms 66, by using the MIM process described above with only the wear-resistant material and the binder. In this situation, members of braze material (not shown) would be provided separately and disposed between the preforms 66 and the recesses 70. The braze material could be made from commercially available green braze tapes, generally containing as nickel-base or cobalt-base braze alloys, or it could be formed by a MIM process as described above for the braze preforms 52.

The preforms 66 containing the wear-resistant material are then bonded to the recesses 70. Generally, the bonding step is carried out by brazing, wherein the braze alloy melts, without any substantial attendant melting of the nozzle segment 54 or the wear-resistant particles. The brazing temperature is largely dependent upon the type of braze alloy used. Because the braze alloy generally has a lower melting point than that of the wear-resistant material, the braze alloy preferentially melts during bonding leaving the particles of wear-resistant material substantially intact, although minor reaction and dissolution of the wear powder and substrate may occur.

The foregoing has described a process for making braze preforms. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A method of assembling a swirler assembly by brazing, comprising:
   providing a flare cone, a swirl cup, a deflector and a dome plate;
   providing a mixture of a brazing alloy in metallic powder form and a binder;
   melting the binder and forming the mixture by metal injection molding into a first preform, a second preform, and a third preform;
   after the step of melting the binder and forming the mixture into performs, leaching the preforms to remove a majority of the binder from the preforms;
   after the step of removing a portion of the binder from the preforms, heating the preforms to a temperature below the liquidus temperature of the metallic powder but high enough to cause the metallic powder to fuse together to simultaneously remove the remainder of the binder and sinter the metallic powder together;
   after the step of heating the preforms to fuse together the metallic powder, holding the preforms at the temperature to consolidate the preforms;
   placing the first preform between the flare cone and an inner cylindrical surface of the swirl cup, placing the second preform into an annular groove defined by the swirl cup, and placing the third preform at a juncture of the deflector and the dome plate;
   heating the flare cone, swirl cup, deflector and dome plate and the preforms to a temperature below the melting point of the flare cone, swirl cup, deflector and dome plate and above the melting point of the preforms to cause the braze alloy to melt and flow; and
   allowing the braze alloy to cool to form a bond between the flare cone and swirl cup and the deflector and dome plate.

2. The method of claim 1 further comprising performing a hot isostatic pressing treatment on the preforms after the heating step and before placing the preforms adjacent to or within the joints.

3. The method of claim 1 wherein the binder is leached by washing the preforms with a solvent selected to dissolve the binder but not the metallic powder.

4. The method of claim 1 wherein the heating is carried out in a chamber having a controlled composition atmosphere.

5. The method of claim 4 wherein the atmosphere is an inert gas.

6. The method of claim 4 wherein the atmosphere is a reducing atmosphere.

7. The method of claim 1 wherein the metallic powder is an alloy of nickel or cobalt.

8. The method of claim 1 wherein the metallic powder includes a melting point suppressant.

* * * * *